United States Patent [19]

Yamada

[11] Patent Number: 4,710,762

[45] Date of Patent: Dec. 1, 1987

[54] DISPLAY SCREEN CONTROL SYSTEM

[75] Inventor: Kimitoshi Yamada, Hadano, Japan

[73] Assignee: Hitachi, Ltd., Tokyo, Japan

[21] Appl. No.: 554,333

[22] Filed: Nov. 22, 1983

[30] Foreign Application Priority Data

Nov. 22, 1982 [JP] Japan .................................. 57-203623

[51] Int. Cl.$^4$ .............................................. G06K 15/20
[52] U.S. Cl. ................................... 340/721; 340/724; 340/799
[58] Field of Search ............... 340/706, 716, 721, 724, 340/798, 726, 799

[56] References Cited

U.S. PATENT DOCUMENTS

| Re. 31,200 | 4/1983 | Sukonick et al. | 340/709 |
|---|---|---|---|
| 4,204,206 | 5/1980 | Bakula et al. | 340/721 |
| 4,428,065 | 1/1984 | Duvall et al. | 340/798 |
| 4,437,093 | 3/1984 | Bradley | 340/724 |
| 4,484,302 | 11/1984 | Cason et al. | 340/721 |
| 4,550,386 | 10/1985 | Hirosawa et al. | 340/721 |

Primary Examiner—John W. Caldwell, Sr.
Assistant Examiner—Alvin Oberley
Attorney, Agent, or Firm—Antonelli, Terry & Wands

[57] ABSTRACT

A terminal device having a keyboard and a display device and connected to a central processing unit through a line, wherein a display screen of the display device is divided into a first field and a second field and on-line processing data is displayed in the first field while off-line processing data is simultaneously displayed in the second field so that an operator can operate the keyboard to prepare a document in an off-line mode while the operator refers to the on-line data. The data displayed in the first field is a portion of the on-line processing data stored in a first buffer memory and the data displayed in the second field is a portion of the off-line processing data stored in a second buffer memory. The sizes and the locations of the data read from the respective buffer memories are designated by parameters on a display control table and the parameters are alterable by operation of the keyboard. Thus, the sizes of the first and second fields on the display are variable and the respective fields can be independently scrolled.

3 Claims, 12 Drawing Figures

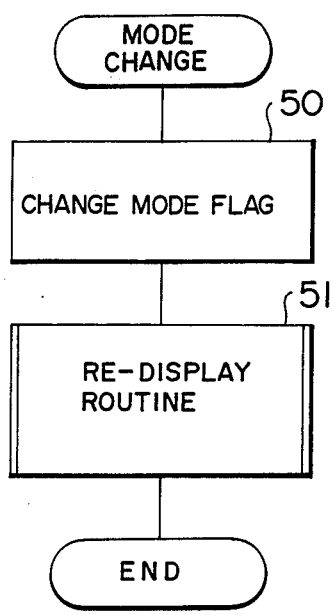
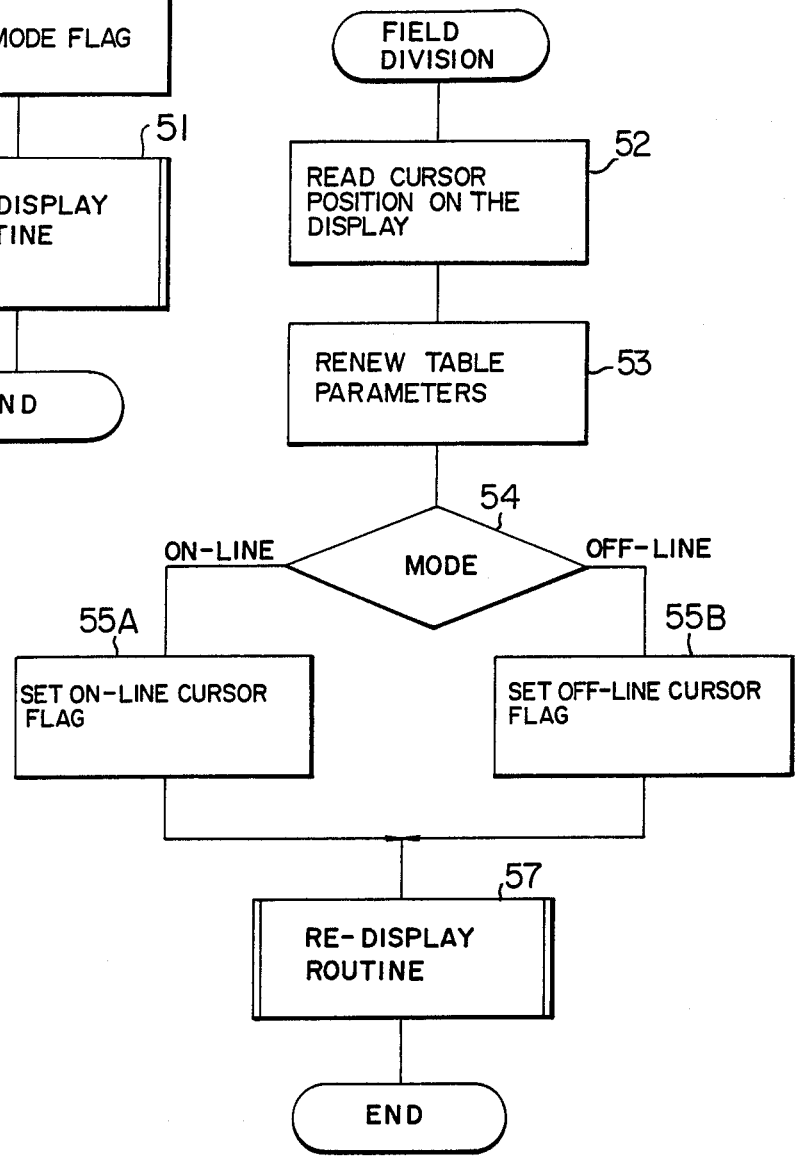

DISPLAY SCREEN CONTROL SYSTEM

BACKGROUND OF THE INVENTION

1. Field of the Invention

The present invention relates to a display screen control system, and more particularly to a display screen control system for use in a terminal device having an on-line function for transferring data between a central processing unit and the terminal device and an off-line function for independently processing data by the terminal device, such as document preparation.

2. Description of the Prior Art

As the are of office automation OA develops, a documentation preparing device, such as a word processor and an off-line document processing device having a document preparation function in addition to a conventional online function of an office computer, have been put into practice as OA office equipment. In such equipment, an operation will operate keys while he or she watches a display screen.

In the prior art devices of this type, however, the on-line processing and the off-line processing cannot be carried out in parallel even in a device having an on-line data processing capability. The on-line function, if any, can be utilized for a relatively simple purpose, such as for batch-transferring document data prepared by the off-line processing to the central data processing unit. Accordingly, it is not possible to refer, on a real time basis, to the document data possessed by the central data processing unit in the course of the preparation of the documentation by the off-line processing by the terminal device and utilize a portion of the document data for the document being prepared, and hence the large amount of the power of the central processing unit is not fully utilized.

SUMMARY OF THE INVENTION

It is an object of the present invention to provide a terminal device and a display screen control system capable of carrying out on-line processing and off-line processing in parallel so that data stored in a central processing unit can be efficiently utilized in the off-line data processing by the terminal device.

In order to achieve the above object, in accordance with the present invention, there is provided a display screen control system for a terminal system having a keyboard, a display device for displaying data and a cursor and line control arrangement for transmitting and receiving data to and from a central processing unit and having an on-line mode data processing function for transmitting data displayed on the display device to the central processing unit or displaying data received from the central processing unit on the display device and an off-line mode data processing function for displaying data inputted from the keyboard on the display device. The display screen control system includes:

- a first memory for storing the data to be processed in the on-line mode;
- a second memory for storing the data to be processed in the off-line mode;
- a third memory for storing parameters for specifying a first data area which has a portion of the data stored in the first memory, a second data area which has a portion of the data stored in the second memory and boundary information; and
- a control circuit for altering the content of the third memory means in accordance with an input from the keyboard, and for outputting the contents of said first and second data areas read from the first and second memory means, respectively, in accordance with the parameters stored in the third memory means, to a first and a second field, respectively, divided on the display screen of the display device;

whereby the off-line processing is allowed while referring to the on-line data on the display screen.

In accordance with one fearure of the display screen control system of the present invention, the first memory stores first cursor information for indicating a specific data location in said first data area, the second memory stores second cursor information for indicating a specific data location in the second data area, and the control circuit displays a cursor at a data display position on the display screen specified by one of the first and second cursor information depending on the processing mode.

In accordance with another feature of the present invention, the keyboard has a key for designating a change in the boundary of the first field and the second field, and the control circuit alters the parameters in third memory, when the key is actuated, to shift the boundary of the first field and the second field on the display screen of the display device toward the cursor position on the display screen.

In accordance with a further feature of the present invention, the keyboard has a key for designating a screen scroll operation the control circuit operates to alter, and the parameters in the third memory, when the screen scroll key is actuated, to substitute one of the first and second data areas corresponding to the field having the cursor displayed therein for another data area in the first or second memory containing the one data area.

The above and other objects and features of the invention will appear more fully hereinafter from a consideration of the following description taken in conjunction with the accompanying drawings wherein one example is illustrated by way of example.

BRIEF DESCRIPTION OF THE DRAWINGS

FIG. 9 is a flow chart showing a control procedure for switching an on-line mode and an off-line mode;

FIG. 11 is a flow chart showing a control procedure for field division.

DESCRIPTION OF THE PREFERRED EMBODIMENTS

Figure 1:
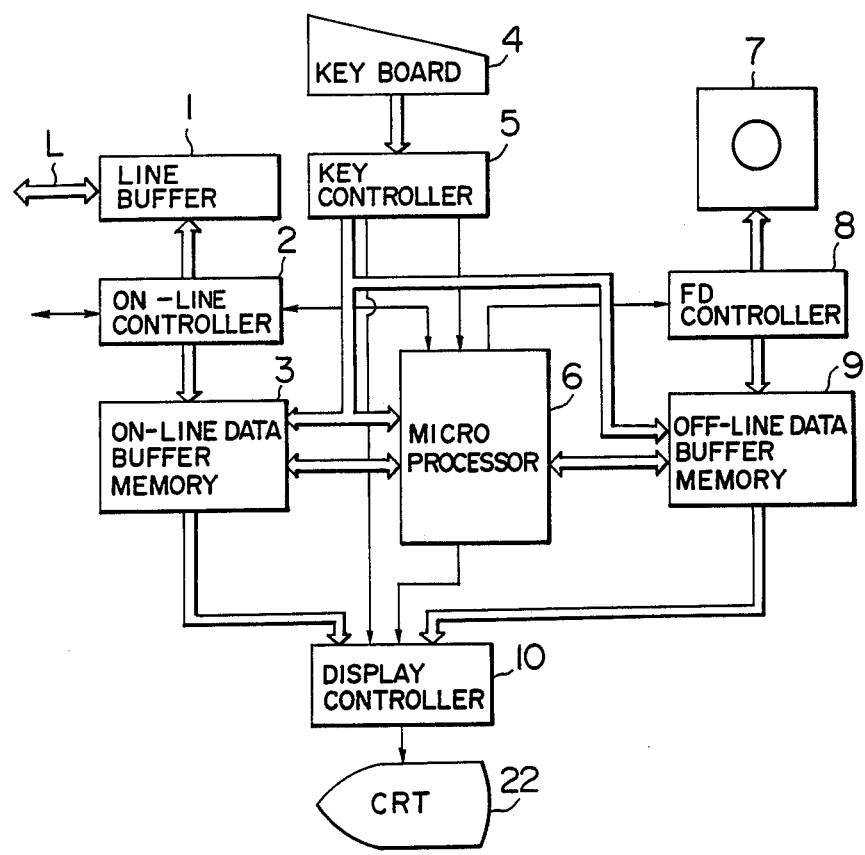
FIG. 1 is a block diagram showing the overall configuration of a terminal device of the present invention.

FIG. 1 shows a block diagram of one embodiment of the terminal device of the present invention having a CRT display 22.

Figure 3:
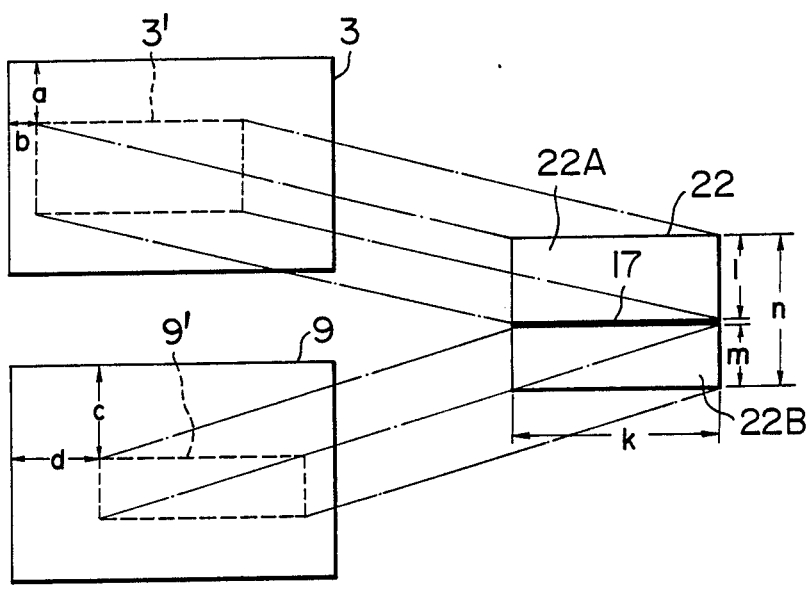
FIG. 3 shows a relationship between the display screen and the data buffer memory in the present invention.

In FIG. 1, numeral 1 denotes a line buffer for temporarily storing received data transferred from a central processing unit (not shown) through a line L and for holding data to be transferred from the terminal device to the central processing unit, and numeral 2 denotes a line controller which controls a receiving operation involving the writing of the data received from the central processing unit by the line buffer 1 into an on-line data buffer memory 3 and a transmitting operation involving the transferring of the data in the memory 3 to the central processing unit through the line buffer 1 when an operator inputs a request through a keyboard 4 to send data. The buffer memory 3 has a memory capacity for storing a field of data which is equal to or larger than a field (e.g. 80 characters by 24 lines) of the CRT display 22. As shown in FIG. 3, data is stored in the memory 3 in a format which allows extraction of a portion of the data stored in the memory 3 as a two-dimensional area 3' and the outputting of the data in that area to an on-line data display field 22A on the display 22. The memory 3 also contains cursor information indicating a data address in the memory corresponding to a cursor position which appears on the on-line field 22A and a cursor flag for indicating any alteration of the cursor information.

Numeral 9 denotes an off-line data buffer memory for storing data to be off-line processed. It has a memory capacity for storing data for a field which is equal to or larger than one sheet of document to be prepared in an off-line process. The memory 9 also stores data in a format which allows extraction of a portion of the stored data as a two-dimensional area 9' as shown in FIG. 3 and outputs the data of the area to an off-line data display field 22B on the CRT display 22. Like the memory 3, the buffer memory 9 also contains cursor information indicating a cursor address in the memory 9 corresponding to a cursor position which appears on the off-line field 22B and a cursor flat for indicating any alteration of the cursor information. Numeral 7 denotes an external storage having a data storing medium, such as a floppy disc, for storing the data edited in the off-line display buffer memory 9. The data transfer between the storage 7 and the buffer memory 9 and the data retrieval from the floppy disc are carried out under control of a controller 8.

Numeral 4 denotes a keyboard which has input keys for inputting KANA characters, alphabetic characters, numeric characters and symbols and function keys for the screen control of the present invention, which keys include a boundary key for commanding the alteration of a boundary (17 in FIG. 3) for the on-line field 22A and the off-line field 22B which simultaneously appear on the CRT display 22, scroll keys having up, down, left and right arrows marked thereon for commanding a direction of scroll of the displays in the display fields 22A and 22B, a mode switching key for commanding switching between the on-line mode and the off-line mode, a cursor positioning key for shifting a cursor position on the CRT display, on-line keys for commanding start of the on-line processing, such as data transmission and interruption, and off-line keys for commanding start of the off-line processing, such as correction and editing of a document.

Numeral 5 denotes a key controller which controls the acceptance of the input from the keyboard 4. In the off-line processing, such as the correction and editing of the document in which a predetermined sequence of key operations are required by an operator, a main microprocessor 6 sets a flag in the key controller 5 in response to the depression of one of the off-line keys which triggers the processing. When the flag is set, only the key inputs related to the progress of the processing are accepted and input information is read into the main microprocessor 6 while the other key inputs are ignored. When the flag is reset, the inputs from the on-line keys and the off-line keys are supplied to the main microprocessor 6 and the screen control inputs from the boundary key, scroll keys, mode switching key and cursor positioning key are supplied to a display controller 10. The input data from the character keys of the keyboard 4 is stored in the buffer memory 3 or the buffer memory 9 depending on whether the display controller 10 designates the on-line mode or the off-line mode, in accordance with the address designated by the cursor information. Whenever data is set in the buffer memory 3 or 9, the cursor information in the buffer memory is updated and the cursor flat for indicating any alteration of the cursor information is set, and a control signal for commanding the re-display is supplied to the display controller 10.

The main microprocessor 6 responds to the actuation of the on-line keys or the off-line keys to instruct inputting/outputting of data to the controller 2 or 8, and in the off-line mode, responds to the input from the keyboard 4 to control the handling of data of the buffer memory 9 and the data transfer between the buffer memories 3 and 9. If the data or the cursor information in the buffer memories 3 and 9 change as a result of the above processing or the reception of the on-line data is reported from the controller 2, the main microprocessor 6 instructs the re-display of the screen to the display controller 10.

The display controller 10 contains a display control table 100 for indicating correspondence between the data areas in the buffer memories 3 and 9 and the display fields on the CRT display 22, and controls operations such as updating of the table 100, updating of the display screen, updating of the cursor information in the buffer memory 3 or 9 in accordance with the display control signals from the key controller 5 or the main microprocessor 6, and switching of the processing mode based on the relation between the physical cursor position on the CRT 22 and the buffer memories 3 and 9.

Figure 2:
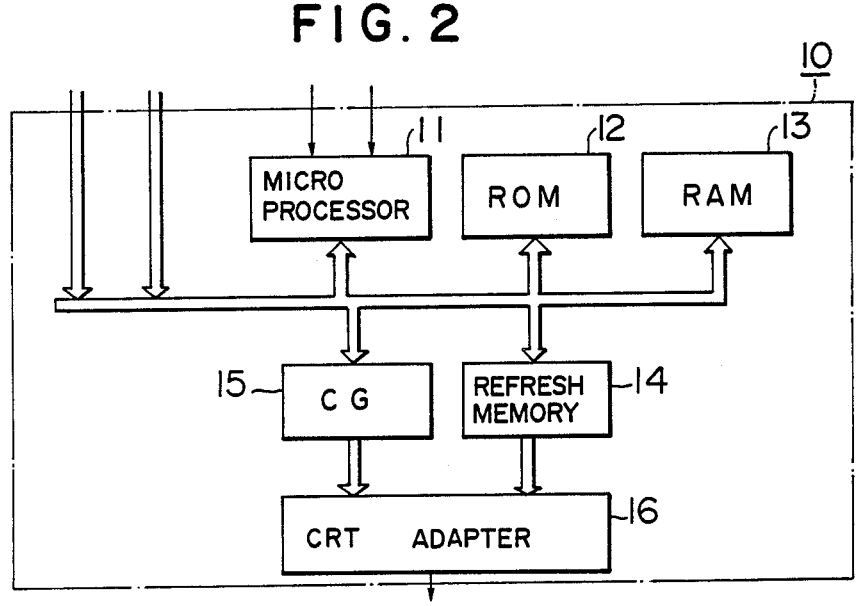
FIG. 2 is a block diagram showing a configuration of the display controller 10 in FIG. 1.

As shown in FIG. 2, the display controller 10 comprises a microprocessor 11, a read-only memory 12 which contains a program necessary for the operation of the microprocessor 11, a random access memory 13 for storing the display control table 100 and other control data, a refresh memory 14 for storing a screen of data to be displayed on the CRT 22, a character generator 15 and a CRT adapter 16 disposed between the character generator 15 and the CRT 22 to display characters and the content of the refresh memory 14 on the CRT 22.

Figure 4:
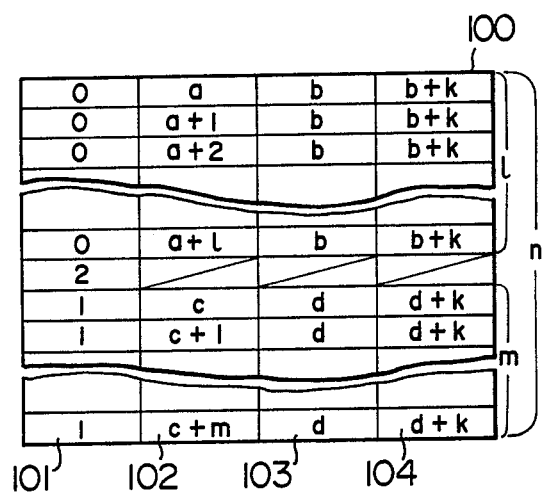
FIG. 4 shows a format of the display control table used to control the display screen.

FIGS. 3 and 4 show the relation between the content of the display control table 100 of the display controller 10 and the display screen on the CRT 22. The display control table 100 defines a data area 3' in the memory buffer 3 corresponding to the on-line field 22A partitioned on the CRT screen 22 and a data area 9' in the memory buffer 9 corresponding to the off-line field 22B. The table 100 comprises a type column 101 for indicating which one of the memory buffers 3 and 9 the data to be displayed belongs to, for each line of the display screen on the CRT, a line number column 102 for indicating a line number of the data in the memory buffer corresponding to the displayed data, and digit position columns 103 and 104 for indicating a start digit position and an end digit position of the displayed data. In the type column 101, "0" is set when the displayed data belongs to the memory buffer 3, "1" is set when it belongs to the memory buffer 9 and "2" is set when the line corresponds to the boundary 17.

In the illustrated example, the physical screen of the CRT 22 has a data display capacity of n lines by k digits (characters) and l lines above the boundary 17 are assigned to the on-line field 22A and m lines below the boundary 17 are assigned to the off-line field 22B. In the on-line field 22A, the l lines by k digits rectangular data area 3' with the a-th line and the b-th digit in the buffer memory 3 being located at a lefttop corner as shown by a broken line in FIG. 3 is displayed, and in the off-line field 22B, the m lines by k digits rectangular data area 9' with the c-th line and the d-th digit in the buffer memory 9 being located at a lefttop corner is displayed.

Figure 5:
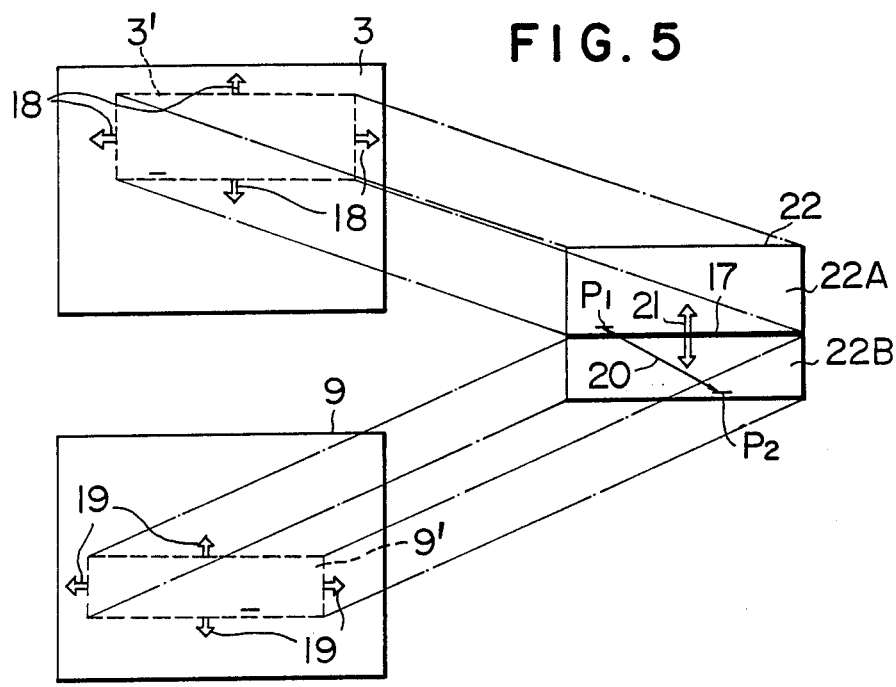
FIG. 5 illustrates a concept of the display screen control of the present invention.

When the cursor shift command, the scroll command, the display command, the processing mode switching command or the field division command is issued to the display controller 10, the data area 3' coresponding to the on-line field 22A and the data area 9' corresponding to the off-line field 22B can be shifted in the buffer memories 3 and 9, respectively, as shown by arrows 18 and 19 in FIG. 5. The cursor on the CRT screen 22 appears at a point, e.g. P1 in the on-line field 22A during the on-line processing mode, and at a point, e.g. P2 in the off-line field 22B during the off-line processing mode. Thus, when the processing mode is switched, the cursor is instantly moved from one of the fields 22A and 22B to the other as shown by an arrow 20. The boundary 17 between the on-line field 22A and the off-line field 22B can be vertically shifted on the CRT screen as shown by an arrow 21 by the boundary key. As a result, the display area of one of the fields 22A and 22B is reduced and the display area of the other is increased.

The alteration of the relation between the display fields on the CRT screen and the data areas in the buffer memories 3 and 9 is attained by changing the content of the display control table 100. The data of the data areas 3' and 9' designated by the table 100 are combined into a screen of data in the refresh memory 14 and it is displayed on the CRT 22.

Details of the screen control of the present invention now will be explained with reference to various flow charts.

Figure 6:
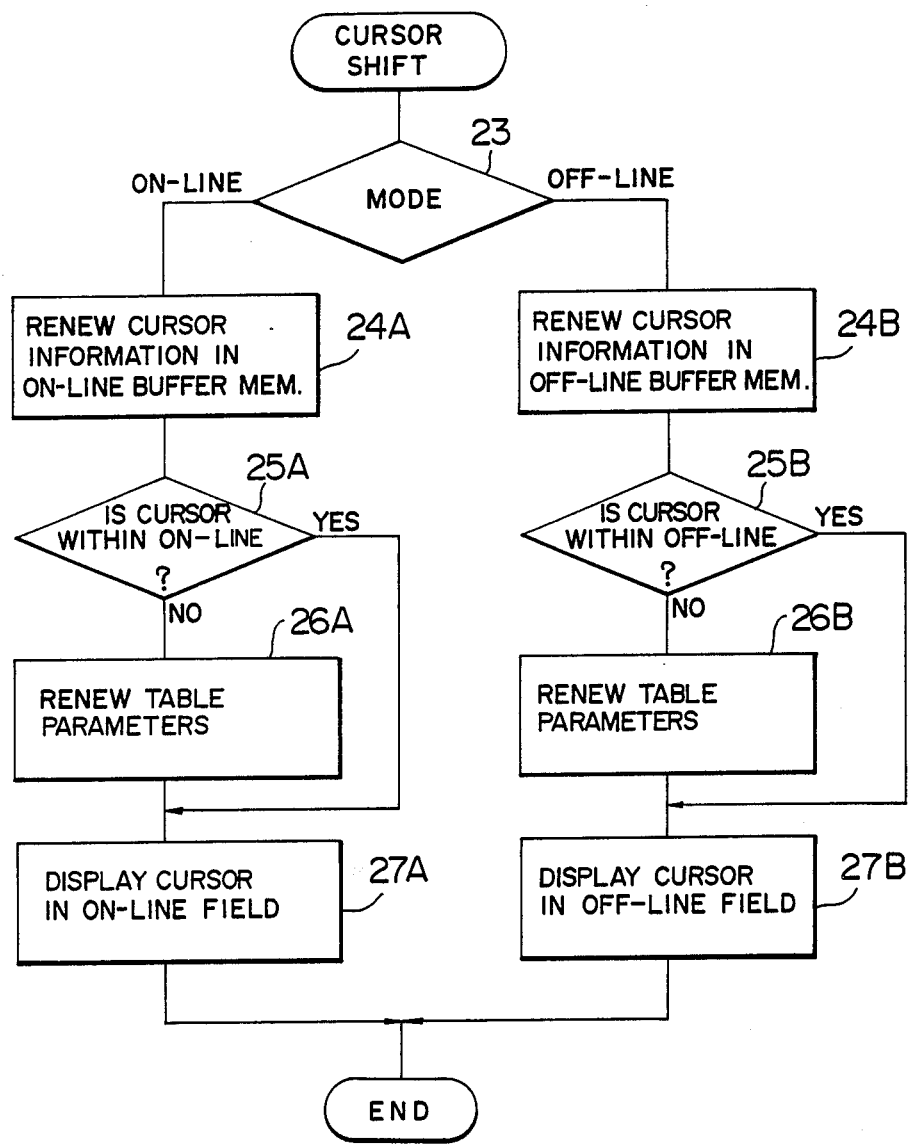
FIG. 6 is a flow chart showing a control procedure for cursor shifting.

FIG. 6 shows a flow chart of a control procedure to be executed by the display controller 10 when the cursor key is actuated. When the cursor shift in the up, down, left or right direction with respect to the current cursor position on the CRT screen is commanded, the current processing mode is determined in a step 23, and if it is the on-line mode, steps 24A-27A are carried out, and if it is the off-line mode, steps 24B-27B are carried out. For example, when it is the on-line mode, the on-line cursor information stored in the buffer memory 3 is changed in the specified direction by the specified amount (by numbers of lines or digits) by the cursor key (step 24A), and it is checked if the new cursor position is within the data area 3' (step 25A). If it is within the area 3', the step 27A is carried out to shift the cursor on the CRT 22 to the new position logically corresponding to the cursor information. In the step 25A, if the cursor position is beyond the data area 3', the parameter of the display control table is changed to shift the data area 3' in the direction of the cursor shift until the cursor comes into the data area 3' (step 26A), and then the step 27a is carried out. As a result, the image scrolled in the direction of the cursor shift is displayed on the on-line field 22A. In the off-line mode, similar steps are carried out for the buffer memory 9 so that the relative position between the cursor position P2 in the off-line field 22B and the displayed data is changed.

Figure 7:
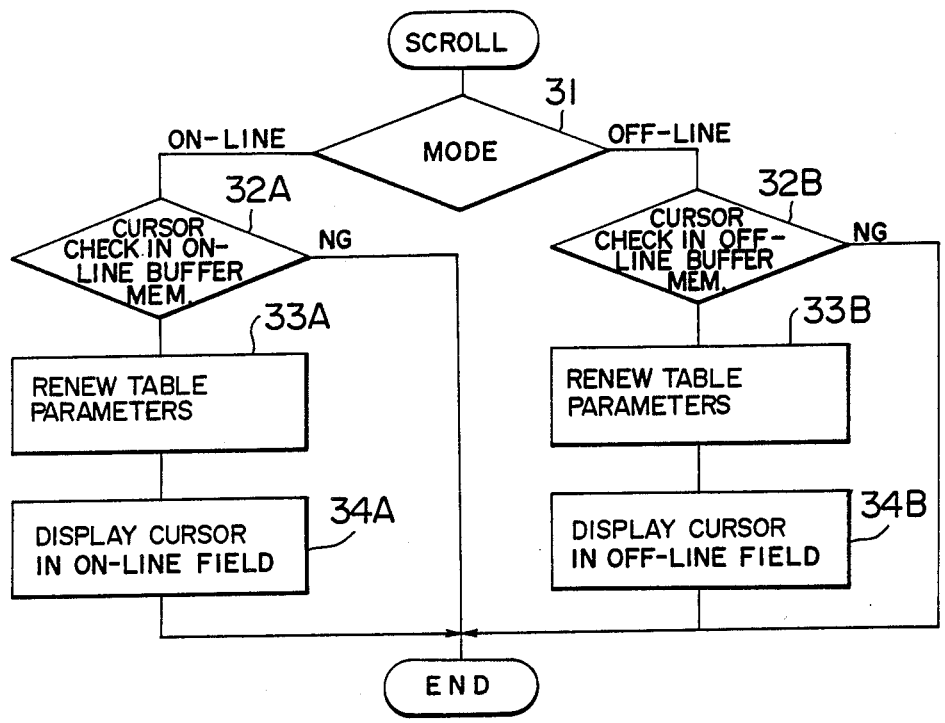
FIG. 7 is a flow chart showing a control procedure for scrolling.

FIG. 7 shows a flow chart of the control procedure of the display controller 10 when scrolling is commanded. The direction of scrolling and the amount of scroll are determined by the scrolling keys. By establishing that one depression of one of the scroll keys for different directions designates a plurality of lines of or a plurality of digits of scrolling, the operation of the operator is facilitated. Only the up and down scroll keys may be provided and the left and right scrolling may be provided by the shifts produced by the cursor key.

In the scrolling operation, the current processing mode is first determined (step 31), and if it is the on-line mode, the steps 32A-34A are carried out, and if it is the off-line mode, the steps 32B-34B are carried out. In the on-line mode, it is checked in the step 32A if the current cursor position stored in the buffer memory 3 will go beyond the display field 22A after the specified scrolling. If the cursor will go beyond the display field 22A (for example, if the cursor is currently at the top line of the display field 22A and the downward scrolling is commanded), the scrolling is not carried out and the display is not changed in order to maintain the relation between the cursor display position and the processing mode. In the decision step 32A, if it is determined that the cursor position will remain in the display field 22A after scrolling, the step 33A is carried out to change the parameter of the display control table 100 so that the data area 3' is shifted in the buffer memory 3 in the specified direction by the specified amount. If one side of the data area 3' contacts one side of the buffer memory 3 in the course of shifting, any further shift in that direction is inhibited. In the step 34A, the cursor information is updated in accordance with the updated display control table 100 and the cursor is displayed on the CRT screen in accordance with the updated cursor information. The display data is set in the refresh memory 14 from the buffer memory 3 or 9 while the updated display control table 100 is referenced. Accordingly, the data not displayed heretofore is now displayed on the on-line field 22A of the CRT screen and a portion of the data displayed heretofore disappears from the screen, and the cursor is also shifted in the scroll direction. The steps 32B-34B in the off-line mode are similar to those in the on-line mode except that the buffer memory 3 is involved rather than the buffer memory 9.

Figure 8:
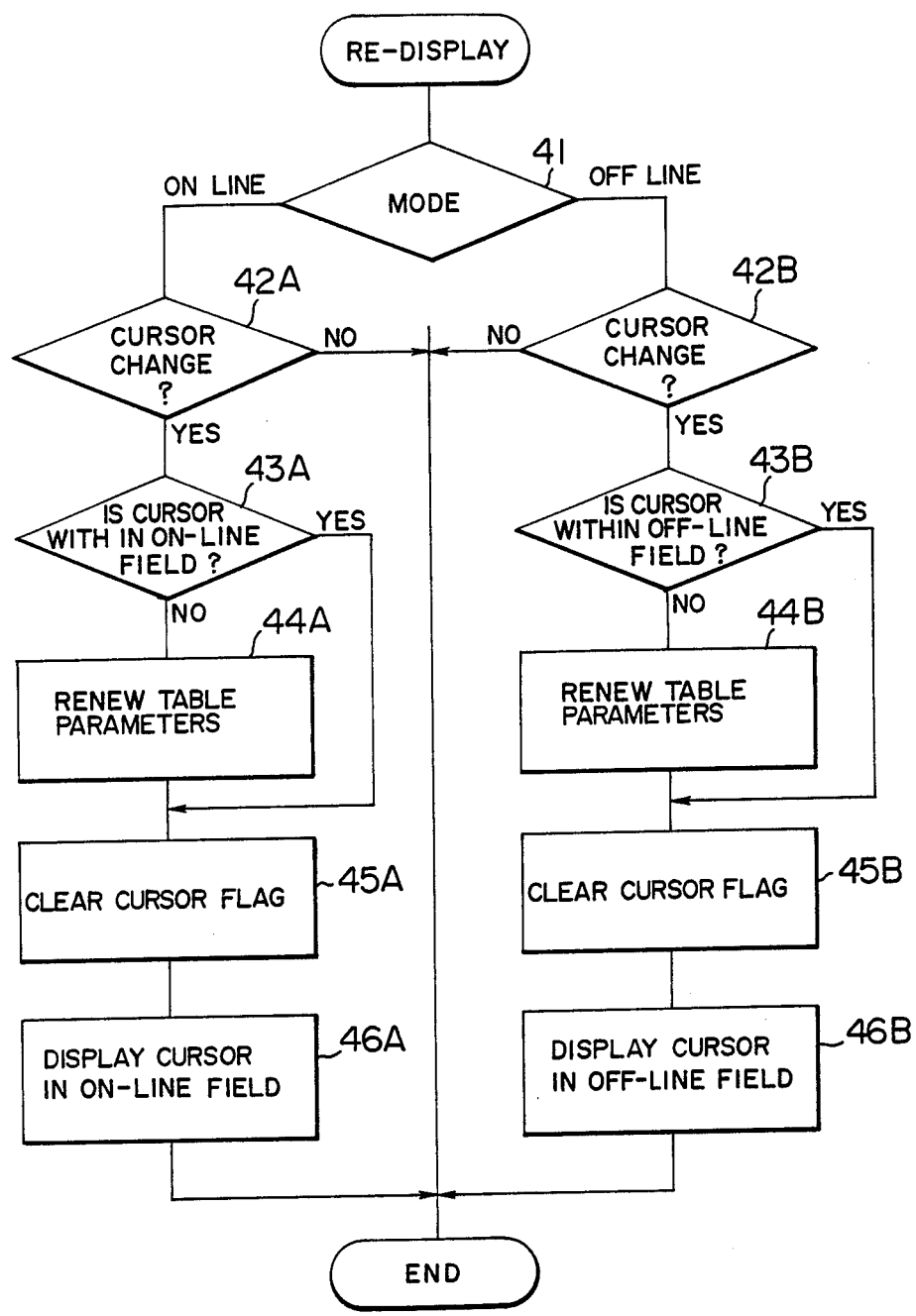
FIG. 8 is a flow chart showing a control procedure for redisplaying.

FIG. 8 shows an operation procedure of the display controller 10 when the re-display is commanded. The re-display command is issued by the main microprocessor 6 when the on-line data in the buffer memory 3 is updated by the reception of the data from the central processing unit or when new document data is set in the buffer memory 9 in the off-line processing.

When the re-display command is issued, the current processing mode is determined in a step 41, and if it is the on-line mode, the steps 42A-46A are carried out, and if it is the off-line mode, the steps 42B-46B are carried out.

In the step 42A, it is checked if the logical cursor position indicated by the cursor information has been altered or not, and if it has been altered, the step 43A is carried out to determine if the new cursor position is within the data area 3' currently displayed on the CRT. If the cursor position is within the data area 3', the step 45A is carried out, otherwise the step 44A is carried out to change the parameter of the display control table 100 such that the data area 3' is shifted toward the cursor position to display the cursor in the on-line field 22A of the CRT screen. Then, the step 45A is carried out. In the step 45A, the cursor flag in the buffer memory 3 is cleared and then the step 46A is carried out to display the cursor in the on-line field 22A of the CRT in accordance with the cursor information. The steps 42B-46B in the off-line mode are similar to the steps 42A-46A except that the buffer memory 3 is involved rather than the buffer memory 9. Even if the content of the buffer memory 3 or 9 is updated, the on-line data area 3' or the off-line data area 9' corresponding to the cursor position is always displayed on the CRT.

FIG. 9 shows a control flow chart of the display controller when the switching between the off-line mode and the on-line mode is commanded by the depression of the mode switching key. When the mode switching is commanded, the mode is switched to the off-line mode if the processing mode flag indicates the on-line mode and to the on-line mode if the flag indicates the off-line mode (step 50), and a step 51 is then carried out to carry out the re-display routine explained in FIG. 8.

If the operator continuously depresses the mode switching key while the cursor information is not changed, the cursor appears in the fields 22A and 22B alternately crossing the boundary 17 as shown by P1 and P2 in FIG. 5.

The operation of the display controller when the field division is commanded by the boundary key is now explained with reference to FIGS. 10A, 10B and 11.

Figure 10A:
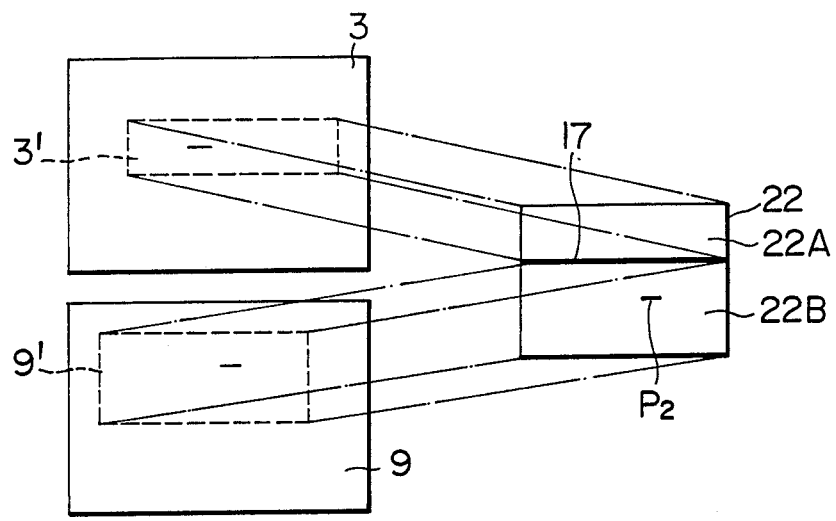
FIGS. 10A and 10B show display screens before and after the field division and the state of a data area in a buffer memory corresponding to the displayed field.
Figure 10B:
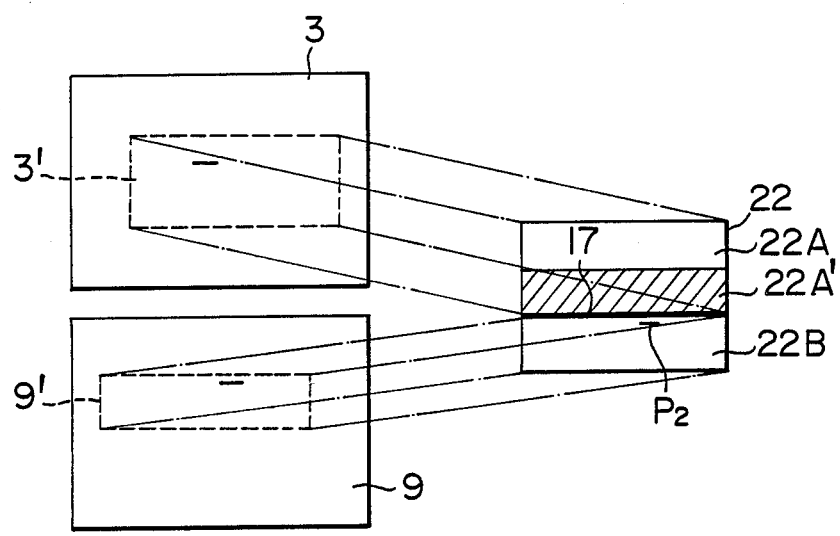

For example, when the on-line field 22A is to be expanded, the processing mode is switched to the off-line mode so that the cursor appears in the off-line field 22B on the CRT as shown in FIG. 10a. The cursor key is actuated to shift the cursor position P2 to a desired position (to which the boundary 15 is to be shifted) and then the boundary key is depressed. As a result, the boundary 15 is shifted to the position adjacent to the cursor P2 and the area 22A' (hatched area) which has belonged to the off-line field up to that time is shifted to the on-line field. The on-line data continuing from the area 22A is displayed in the area 22A' and the offline data is displayed in the remaining off-line field 22B with the content of the area 22A' off-line field data disappearing. When it is desired to expand the off-line field 22B, the cursor is positioned in the on-line mode and the boundary key is then depressed.

A flow chart for the field division is shown in FIG. 11. In a first step 52, the cursor position on the CRT screen is read. In a step 53, a line on the display control table 100 of FIG. 4 which corresponds to the cursor position read in the step 52 is referred to. If the content of the type column 101 of that line is "1", it is determined that the expansion of the on-line field 22A has been commanded and the parameters are changed to set the boundary on the line immediately preceding that line and assign the lines thereabove to the on-line data area 3'. If the content of the type column 101 of the line coresponding to the cursor position is "0", it is determined that the expansion of the off-line field 22B has been commanded and the parameters are changed to set the boundary on the line immediately succeeding that line and to assign the lines therebelow to the off-line data area 9'. The parameters are changed in such a manner that the new parameters in the columns 101-104 are continuous values to the existing parameters. The display screen is expanded within the limit of the buffer memory 3 or 9, and if the line parameter on the display control table 100 goes beyond the line address of the buffer memory 3 or 9, the boundary is set to that line irrespective of the cursor position and that line is set as the limit of the expansion.

After the updating of the display control table, the current processing mode is determined in a step 54, and if it is the on-line mode, the cursor information in the buffer memory 3 is updated and the cursor flag is set in a step 55A, and if it is the off-line mode, the cursor information in the buffer memory 9 is updated and the cursor flag is set in a step 55B. Then, a step 57 is carried out to execute the re-display routine shown in FIG. 8.

In the above description, the parameters of the display control table area are changed in the step 53 to set the boundary on the line immediately preceding or succeeding the line corresponding to the cursor position on the CRT. Alternatively, the boundary may be set on the line corresponding to the cursor position and the cursor on the CRT may be shifted by one line after the updating of the display control table.

In the above embodiment, the data to be displayed in the on-line field 22A and the off-line field 22B on the CRT 22 are edited in the refresh memory 14, and the data read therefrom is converted to the dot signals for the respective scan lines by the character generator. However, it is possible to omit the refresh memory and read out the data for the data areas 3' and 9' from the buffer memories 3 and 9 and convert them to the dot signals by the character generator. Further, while the display controller in the embodiment has the main microprocessor 6 and the independent sub-microprocessor 11, the control operation by the submicroprocessor 11 may be carried out by the main microprocessor 6.

I claim:

1. A display screen control system
capable of carrying out simultaneously a plurality of functions of a terminal connected to a central processing unit, said system comprising:
first memory means for storing data to be processed by a first function;
second memory means for storing data to be processed by a second function;
third memory means for storing parameters which specify a first data area which has a part of the data stored in said first memory means, a second data area which has a part of the data stored in said second memory means, and boundary information for the display of said data;
input means operated by an operator for inputting data and commands for changing the contents of said third memory means;
control means for changing the contents of said third memory means in response to commands from said input means;

a single display device having a display screen for displaying data; and display control means for taking out the data of said first and second data areas from said first and second memory means and for supplying said data to said single display device for simultaneous display in first and second fields on said display screen in accordance with the parameters in said third memory means;

wherein data which corresponds to a plurality of different works are displayed simultaneously on respective areas of the same display screen; and wherein said input means includes a keyboard having an alteration key for designating alteration of the boundary between said first field and said second field, and said control means comprises means for altering the parameters in said third memory means, when said alteration key is actuated, to shift the boundary of said first field and said second field on the display screen of said display device.

2. A display screen control system according to claim 1, wherein said first memory means stores first cursor information for indicating a specific data location in said first data area, said second memory means stores second cursor information for indicating a specific data location in said second data area, and said display control means operates to display a cursor at a data display position on the display screen specified by one of said cursor information depending on a processing mode designated by said input means.

3. A display screen control system according to claim 2, wherein said input means includes a keyboard having a scroll key for designating a screen scroll operation, and said control means further comprises means for altering the parameters in said third memory means, when said scroll key is actuated, to replace the parameter which specifies one of said first and second data areas with another parameter identified by cursor information stored in said first or second memory means relating to said one data area.

* * * * *